United States Patent Office.

RACHEL NEWCOMB, OF SOUTH BROOKLYN, NEW YORK.

Letters Patent No. 65,688, dated June 11, 1867.

IMPROVED LINIMENT.

*The Schedule referred to in these Letters Patent and making part of the same.*

TO ALL WHOM IT MAY CONCERN:

Be it known that I, Madame RACHEL NEWCOMB, of South Brooklyn, in the county of Kings, and State of New York, have invented a new and improved Liniment; and I do hereby declare that the following is a full, clear, and exact description thereof, which will enable others skilled in the art to make and use the same.

The present invention relates to a liniment composed of the following ingredients, mixed together in and about the proportions stated, viz: One ounce oil of spearmint, one pint alcohol, one ounce oil of thyme, one ounce oil of rosemary, one ounce oil of sassafras, one ounce laudanum, one ounce tincture of cayenne, one ounce spirits of hartshorn, one ounce camphor gum, one ounce oil pennyroyal.

The liniment, made as above described, is an admirable remedy for rheumatism, pains in the side, back, and limbs, as well as bruises and spasms of all descriptions. It is superior to all others now in use, and for sore throat, headache, bites of insects, as well as, many other purposes, it will be found most admirable and desirable.

Having thus described my invention, I claim as new, and desire to secure by Letters Patent—

The liniment, made of the ingredients, mixed together in and about the proportions hereinabove described.

The above specification of my invention signed by me this 26th day of February, 1867.

RACHEL NEWCOMB.

Witnesses:
ALBERT W. BROWN,
WM. F. MCNAMARA.